United States Patent [19]

Brown

[11] Patent Number: 4,970,836
[45] Date of Patent: Nov. 20, 1990

[54] ACCESS OPENING CLOSURE DEVICE

[75] Inventor: Carlton E. Brown, Tucson, Ariz.

[73] Assignee: Air Concepts, Inc., Tucson, Ariz.

[21] Appl. No.: 374,530

[22] Filed: Jun. 30, 1989

[51] Int. Cl.⁵ .............................................. E04F 17/00
[52] U.S. Cl. ........................................ 52/221; 52/208;
                                              52/507; 52/511; 49/465
[58] Field of Search ................. 52/220, 514, 208, 507,
                              52/511, 221; 49/463, 465; 24/502, 514

[56] References Cited

U.S. PATENT DOCUMENTS

| 535,390 | 3/1895 | Murphy | 49/465 |
|---|---|---|---|
| 1,179,869 | 4/1916 | Schmidt | 49/465 |
| 2,238,865 | 4/1941 | Purinton | 52/511 X |
| 3,088,560 | 5/1963 | Preuss | 52/511 X |

OTHER PUBLICATIONS

Sweet's Catalog File, 1985, vol. 9, pp. 8.12/Bab-3, 8.12/Kar-4.

Primary Examiner—Carl D. Friedman
Assistant Examiner—Linda J. Hoffert
Attorney, Agent, or Firm—Richard R. Mybeck

[57] ABSTRACT

A closure device for access openings having a face plate attractively complementing the surface in which said opening occurs and manually driven spring biased latching mechanisms for securing the device in closing relationship to such opening. Optional gasket means and insulative batt enhance the versatility of the device.

8 Claims, 1 Drawing Sheet

ACCESS OPENING CLOSURE DEVICE

INTRODUCTION

The present invention relates generally to an access opening closure device and more particularly to an access opening closure device having universal application to cover openings defined in duct work, wood panels, sheet rock and like construction materials.

BACKGROUND OF THE INVENTION

Panel-like structural members are commonly employed for the internal and external walls of dwellings, office buildings, warehouses and the like. Analogous construction is likewise used in certain vehicles such as tractor trailers, recreational vehicles, buses, airplanes and the like.

When such panels are permanently installed, there are occasions when a panel must be opened, preferably without removing and replacing the entire panel, in order to access wiring, plumbing fixture and the like which were disposed behind the panel in the course of the original construction. When such an extemporaneous access is necessary, an appropriate opening can be defined using a drill to create an access port and a scroll saw or the like to enter that part and carefully define the desired perimeter of the opening through which access to the previously hidden service problem is obtained.

Once the repair is effected, a clear need exists for means and methods to close that opening, preferably in a detachable and attractive fashion, to restore the integrity of the panel while permitting ready ingress and egress to the service facility for future repairs if needed. It is toward this end that the present invention is directed.

The prior art teaches three general types of plate-like closure means for panel openings. First, there is the sliding-type closure means exemplified by the double-hung window wherein the slidably closeable plate member remains within the plane of the panel opening. The main disadvantage of this type of closure arises from the inherently limited degree of ventilation obtainable which is usually limited to about 50 percent of the panel opening size. Second, there is the pivotal-type closure means wherein a single peripheral edge of the plate member is pivotably attached to the panel. The main disadvantage of the pivotal type of closure means is that the plate member projects excessively away from the panel in order to obtain full ventilation through the panel opening. Third, there is the scissors-type closure means wherein the entire periphery of the plate member is effectively attached to the periphery of the panel opening with a scissors-type linkage whereby the plate member is maintainable in substantial parallelism with the plane of the panel opening. The main disadvantages of the scissors-type closure means are the expense of the scissors-type linkage, the impediment it creates relative to air-flow characteristics, and the generally troublesome operational characteristics of scissors-type linkages per se.

BRIEF SUMMARY OF THE INVENTION

The present invention relates generally to an access opening closure device having universal application to close openings in duct work, wood panels, sheet rock and the like. The device is adaptable to any shaped hole, e.g., circular, rectangular, and the like and can be used with any thickness of material ranging from flat sheet metal up to and including two inch thick walls.

It is also well suited for use as a removable cover plate for hidden valves, switches, sensors, controls, and the like where periodic ingress and egress is needed, but in between times, security is desired.

A unique feature of the closure device of the present invention is that it does not require any subframe or framing members in order to be installed behind or within the opening in the wall or duct work. The closure device is a self-securing free standing member and only preparatory trimming of the opening, such as removal of large burrs, is required for installation.

In a preferred embodiment of this device, a face plate having a plurality of spring-biased clamping means mounted on the obverse side thereof are collectively circumscribed by a gasket means disposed thereon to assume a frame-like relationship around the opening to be covered thereby when installed pursuant hereto. The device thusfurther provides an effective seal when used with either negative or positive pressurized air handling duct work. Furthermore, the device protrudes only slightly into the duct work, it being essentially the same thickness as standard duct insulation. Thus, when installed pursuant hereto, the closure has substantially no effect on air distribution flow patterns. Furthermore, when needed, the device is adapted for insulation and thus avoids undue heat loss and/or sweating when circumstances require.

The device also provides an architecturally pleasing finished appearance to what could be an eye sore. This device can be used in those cases where an entry is needed in a finished wall and it can be installed with the creation of only a minimal size opening. Unlike the current practice of tearing out a substantially larger segment of the wall in order to install framing members and/or sub-frame, the device of the present invention provides a sizable savings in materials, labor and time.

Finally, the present invention provides spring loading clamping means or retention arms which enable fast and effective installation. There is no time lost fumbling around with the device even if the attachment screw is removed completely because the retention arms stay in a known position until the screw is reinstalled.

It is accordingly the principal object of the present invention to provide new and improved closure means for panel openings that overcome the several disadvantages and deficiencies of prior art closure mechanisms.

It is another object of the present invention to provide a closure mechanism that is amenable to panel openings and plate members of various geometrical shapes and sizes including polygonal, circular, and even highly irregular shapes.

It is a further object of the present invention to provide a new and improved closure mechanism which can be installed manually and is amenable to and adaptable for various kinds of panel structures and environmental situations therefor.

Still another object of the present invention is to provide a closure mechanism that is economical to manufacture and maintain and which possesses exceedingly reliable operational characteristics.

It is still a further object of the present invention to provide a closure mechanism that is amenable to various kinds of plate member materials including tansparent, translucent, and opaque.

These and still further objects as shall hereinafter appear are readily fulfilled by the present invention in a remarkably unexpected fashion as will be readily discerned from the following detailed description of exemplary embodiments thereof especially when read in conjunction with the accompanying drawing in which like parts bear like numerals throughout the several views.

DESCRIPTION OF PREFERRED EMBODIMENTS

Figure 1:
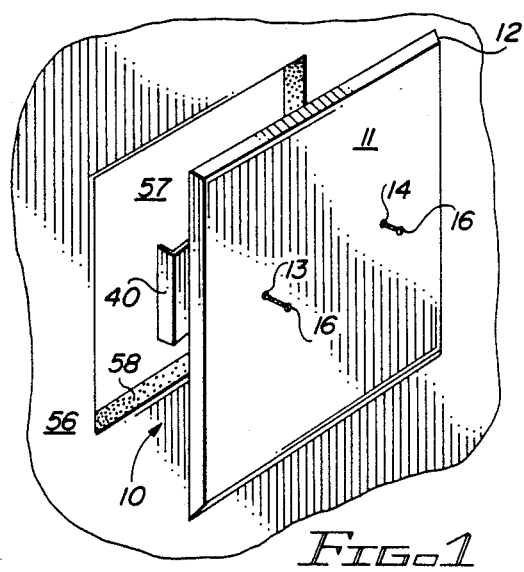
FIG. 1 is an isometric view of an access opening closure device embodying the present invention.

Referring to the drawing, an access opening closure device embodying the present invention is identified by the general reference numeral 10.

As shown in FIGS. and 2, each device 10 comprises a face plate 11 having a beveled edge 12 circumscribed thereabout in a framing relationship thereto.

A first and second punched openings 13, 14, are respectively defined through face plate 11 and each receives an elongated screw member 16 therein in free sliding relationship thereto for a purpose to be hereinafter described in detail.

Figure 2:
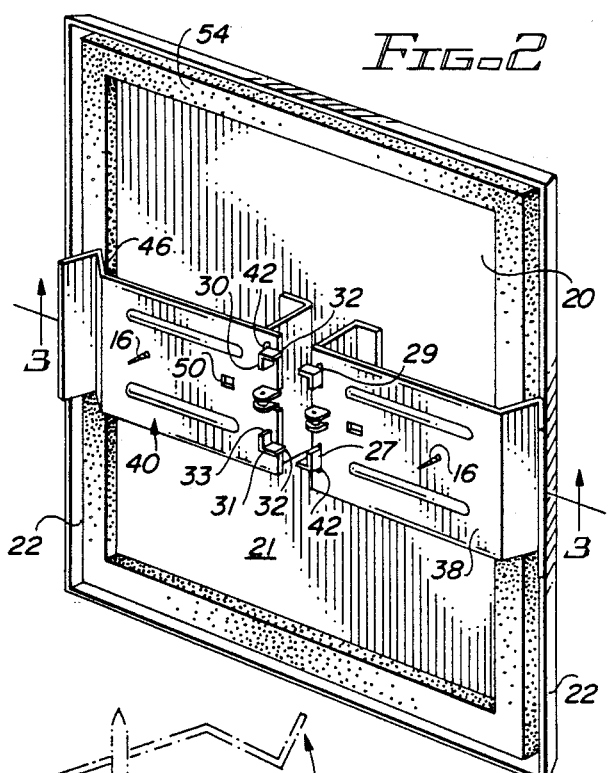
FIG. 2 is an isometric view of the rear of the closure device shown in FIG. 1.
Figure 3:
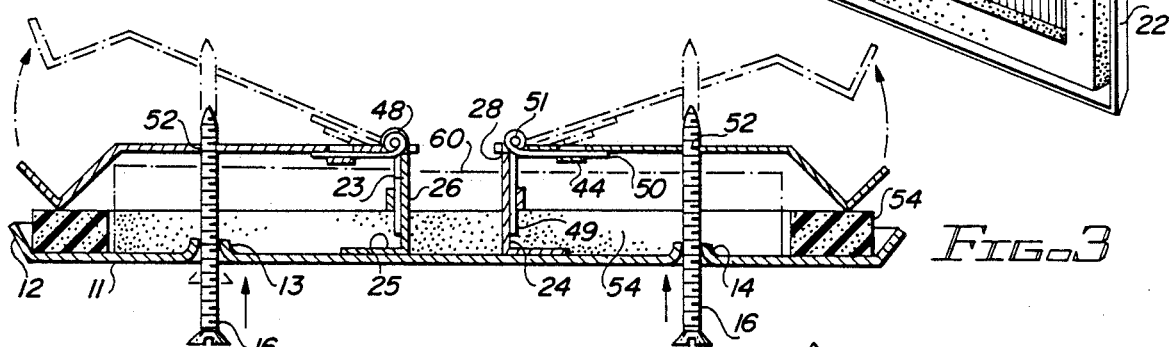
FIG. 3 is a cross-section of the latching mechanism of the device taken along line 3—3 of FIG. 2.

The rear surface 20 of face plate 11 is shown in FIGS. 2 and 3 and comprises a body portion 21 circumscribed by a divergent edge 22. In axial alignment on body portion 21 are a first support member 23 and a second support member 24 disposed in spaced generally parallel relationship to each other. Each support member, for example, member 23 is preferably L-shaped and consists of a base plate 25 suitably secured to body portion 21 and an upright portion 26 integrally formed with base plate 25 and having a first and a second flange-shaped retention member 27 formed on the upper edge 28 of upright portion 26. Each member 27 comprises a neck portion 29 and a flag-like upper portion 30 which as will hereinafter appear, has vertical fold line 31 about which an outer portion 32 is disposed generally normal to inner portion 33 for reasons to be hereinafter disclosed. A spring detent 34 is formed on the inner surface 35 of upright portion 26 and its function will likewise be hereinafter described.

Each L-shaped support member, for example, member 24, coacts with an associated wing member 38 to form a latching mechanism 40 which will now be described in detail.

Each wing member 38 comprises a body portion 41 having spaced transversely extending slots 42 defined adjacent the leading edge 43 thereof. A spring retention detent 44 is formed on the underside 45 of body portion 41. Wing member 38 further comprises a diverging panel portion 46 integrally formed with body portion 41 and extending outwardly therefrom to a lip or edge portion 47 integrally formed with diverging portion 46 and extending generally normal therefrom.

Latching mechanism 40 is completed by the incorporation of a spring member 48 having a first extending arm 49 and a second extending arm 50 protruding from a biased coil portion 51 in combination with an intermediate support member 23,24 and its associated wing member 38 in the following manner.

First arm 49 is inserted into spring detent 34 and second arm 50 is inserted into spring detent 44 with coil portion 51 disposed between leading edge 43 and upper edge 26. Each retention member 27 is simultaneously passed up through a corresponding slot 42 until flag-like portions 30 extend above wing member 38 whereupon outer portion 32 of support portion 30 is bent on fold line 31 until portion 32 is extending essentially normal to inner portion 33 and wing member 38 is locked to its corresponding support member 23, 24, and pivotal relative thereto which pivotal action is biased by spring 48 to cause lip portion 47 to engage edge 22 of back plate 20.

The assembly of the closure device 10 is completed by drilling a hole 52 in each wing member 38 in registry with each of punched openings 13,14 so that each screw member 16 which extends through openings 13, 14 and can me threadedly engaged into each using member 38. Thus, the rotation of screw member 16 causes its corresponding wing member 38 to be moved away from or toward back surface 20 in response to the direction of rotation of the respective screw member 16. In one direction, the rotation of screw members 16 will cause wing member 38 to move in opposition to the natural bias provided by spring coil 51, which, as previously explained, is biased to force lip portion 47 toward the adjacent beveled edge 22 of back surface 20. In the other direction, the rotation of screw member 16 will complement the action of coil 51 and bring lip portion 47 into sealing engagement with the wall 56, to which it is attached.

Figures 4B, 4C:
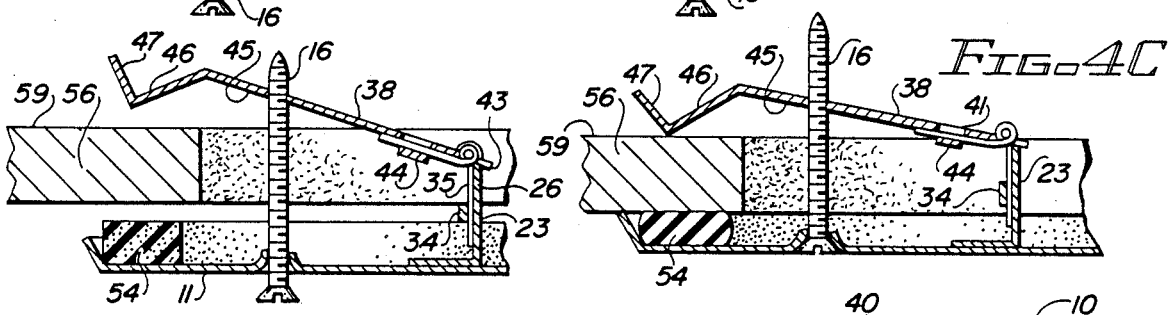
FIG. 4B is a cross-section of a latching mechanism embodying the present invention in its "open" position.
FIG. 4C is a cross-section of the latching mechanism of FIG. 4A in its "closed" position.

In one embodiment of the present invention which is particularly suitable when plumbing connections are to be hidden behind the closure 10, a frame-shaped gasket 54 formed of rubber or suitable sealing plastic material will be disposed in the channel defined by beveled edge 22 when closure 10 is mounted to a wall 56 having an opening 57 defined therethrough whereupon gasket 54 provides an effective seal between plate 11 and wall 56.

Where appropriate, a batt 60 of suitable insulation will be attached by cement, or the like, to body portion 21 of back surface 20 as shown in FIGS. 3, 4B and 4C.

In use, a closure device 11 is assembled as indicated and brought to an access opening 57 which has been neatly defined as with a conventional saber saw or the like in a wall 56 or wallboard which had to be puntured in order to gain access to plumbing, wiring or like utility disposed behind wall 56.

Figure 4A:
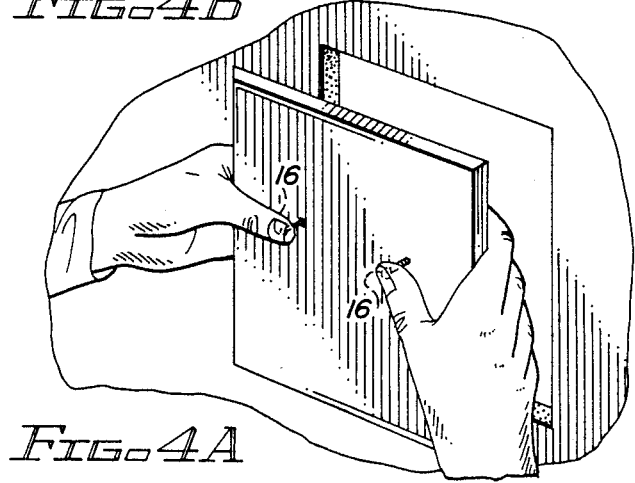
FIG. 4A is an isometric view showing the installation of the closure device of FIG. 1 into an access opening in accordance herewith.

To easily install device, each screw member 16 is pressed by hand to cause its associated wing member 38 to pivot relative to its support members 23, 24, respectively, as shown in FIGS. 3 and 4, or open its jaws. This allows device 10 to effectively clear the edges 58 of opening 57 and to be readily seated with beveled edges in contact with wall 56. Thereupon, screw members 16 are actuated to draw wing members 38 toward back plate 20 until the interface between diverging portion 46 and lip portion 47 engages the interior surface 59 of wall 56 as shown in FIG. 4C. Device 10 is then firmly and snugly seated in opening 57 and tightened in place by rotation of screw member 16 until tight. A snugly sealed, removable closure has then been provided for opening 57.

Access to the area behind the closure 10 is readily obtained simply by turning screw members 16 to cause wing members 38 to retract from its engagement with the inner surface 59 of wall and provide the clearance necessary to remove closure 10 from within opening 57.

Figure 5:
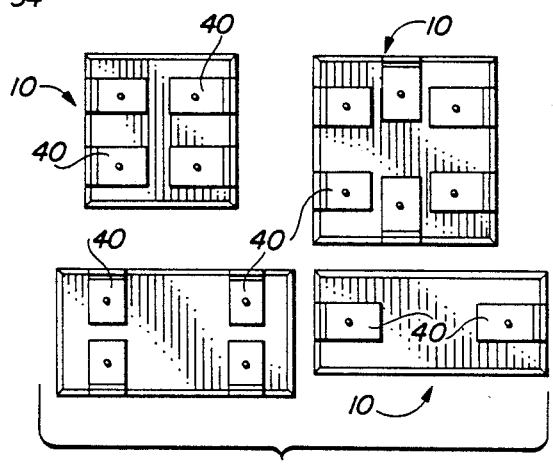
FIG. 5 is a montage of variations of a closure device embodying the present invention which have been specifically adapted for a variety of openings having diverse sizes and shape.

Of course, many diverse sizes and shaped openings can result when one begins altering an existing structure in connection with installation and/or repairs. The present invention is readily adaptable to meet such exigencies as shown in FIG. 5. Thus, simply by relocating the latching mechanisms 40 or increasing the number thereof, much larger and elongated openings are readily accommodated.

In summary, the present invention provides a novel access opening closure device which embodies unitary construction. The device is self-securing by means of independently operable laterally extending retention arms. Each lateral retention arm consists of a cantilevered using member hinged at its supported interior end and extending outwardly from the center of the obverse side of the faceplate to the periphery in the same plane. Each retention arm has a spring bias to provide positive positioning prior to installation. The angle of the retention arms is inclined by means of pressure applied to a screw placed midpoint between the hinge and distal end of the cantilevered wing member and closed by tightening the screw into the wing member transmitted to the distal end by drawing that end into coactive relationship with the faceplate to form a vice while firmly grips the intervening wall surface therebetween and draws the device into a flush relationship relative to the outer wall surface. The sealing gasket when used is compressed between the obverse face of the device and the outer wall surface to render the closure leak resistant. The device further comprises a beveled edge around the entire periphery of the faceplate which lends structural support and enhances gasket retention. The device requires no additional structure or support to function. The device is removable and can be re-installed as desired.

From the foregoing, it becomes apparent that new and useful procedures have been herein described and illustrated which fulfill all of the aforestated objectives in a remarkably unexpected fashion. It is of course understood that such modifications, alterations and adaptations as may readily occur to an artisan having the ordinary skills to which this invention pertains are intended within the spirit of the present invention which is limited only by the scope of the claims appended hereto.

What is claimed is:

1. A device for covering access openings defined in wall panels and like construction members comprising: a face plate having a front surface and a rear surface; a plurality of spring biased clamping members each having a support member secured to said rear surface of said face plate in spaced relationship to each other, each support member having a wing member, a base plate, and an upright portion integrally formed with said base plate, said upright portion including a plurality of retention members, each retention member extending upwardly from said upright portion for coaction with a different one of said wing members to form a pivot junction therewith for pivotal movement of said wing member thereabout; and torsional spring members operatively interposed between said support member and said wing member associated therewith to bias said wing member toward engagement with said face plate actuating means coacting with said face plate and each of said clamping members to actuate said clamping member between an open and a closed position about said pivot junction relative to said face plate and said construction member and about the opening described therein.

2. A device according to claim 1 in which said face plate has a divergent beveled edge framed thereabout for engaging a construction member in edge-to-surface relationship about an opening defined therein.

3. A device according to claim 2 in which said beveled edge has a front surface and a rear surface and a gasket member is disposed on said rear surface of said beveled edge.

4. A device according to claim 1 in which said spring means has a first arm member and a second arm member, said first arm member being secured to said support member and said second arm member being secured to said wing member.

5. A device according to claim 4 in which said actuating means comprises a plurality of openings defined in said face plate, and a like number of threaded openings disposed one each in each of said wing members in general axial registry with a corresponding one of said openings in said face plate, and a plurality of elongated members each having a detent on the proximal end thereof and a threaded portion on the distal end thereof and extending one through each of said openings in said face plate for threaded engagement in said corresponding threaded opening in said wing member, said elongated member being rotatable in said threaded opening to selectively move said wing member toward and away from said face plate to secure and unsecure said device relative to said construction member and about the opening described therein.

6. A device according to claim 4 in which said face plate has a divergent beveled edge framed thereabout for engaging a construction member in edge-to-surface relationship about an opening defined therein.

7. A device according to claim 6 in which said beveled edge has a front surface and a rear surface and a gasket member is disposed on said rear surface of said beveled edge.

8. A device according to claim 7 in which an insulation batt is secured to said rear surface of said face plate.

* * * * *